Aug. 19, 1941.     L. H. SOHL     2,252,871
AUTOMOTIVE VEHICLE
Filed Nov. 9, 1940

INVENTOR.
LESTER HENRY SOHL.
BY Nathan Levin
ATTORNEY.

Patented Aug. 19, 1941

2,252,871

UNITED STATES PATENT OFFICE 2,252,871

AUTOMOTIVE VEHICLE

Lester Henry Sohl, Monmouth Junction, N. J.

Application November 9, 1940, Serial No. 365,036

6 Claims. (Cl. 180—53)

This invention relates to that type of automotive vehicle having an engine for propelling the same and in which a power take off mechanism receives power from the engine for performing a task in connection with a load carried by the vehicle. More particularly this invention relates to auxiliary means outside the vehicle for controlling the operation of the power take off means in addition to or in place of the means normally provided within the vehicle.

In an automotive vehicle truck adapted to carry a tank load of oil and having a pump to discharge the oil from the tank, means consisting of a power take off from the vehicle engine is provided to operate the pump. The controlling means, whereby the engine is connected to the pump, is normally provided within the driver's cab and consists of the vehicle clutch and a gear engaging lever which, when the vehicle clutch is depressed, is adapted to move a gear of the power take off means into engagement with a driving gear in the vehicle transmission, thus operating the power take off means and the connected oil discharging pump. It is a disadvantage to have the controlling means only inside the cab as the driver must then, if he is alone, climb into and out of the cab unnecessarily in positioning the truck close to the oil receiving point and in starting and stopping the power take off means.

By means of this invention, the driver after first positioning the truck in proper position relative to the oil receiving point, may leave the cab and need not re-enter until the oil discharge is completed and he is ready to depart.

Figure 1:
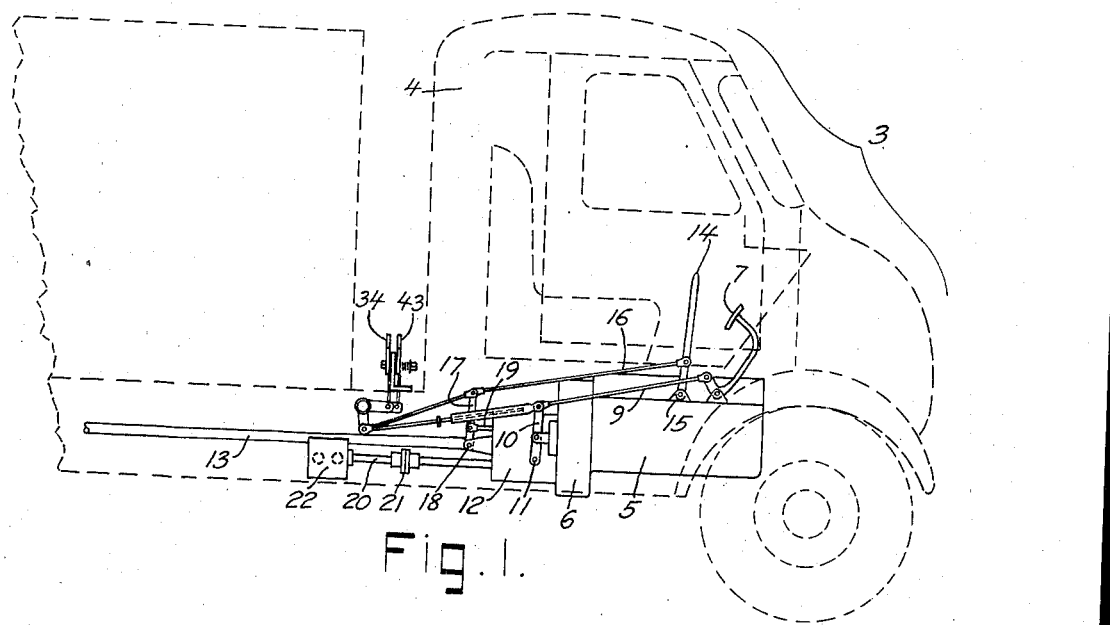
Figure 2:
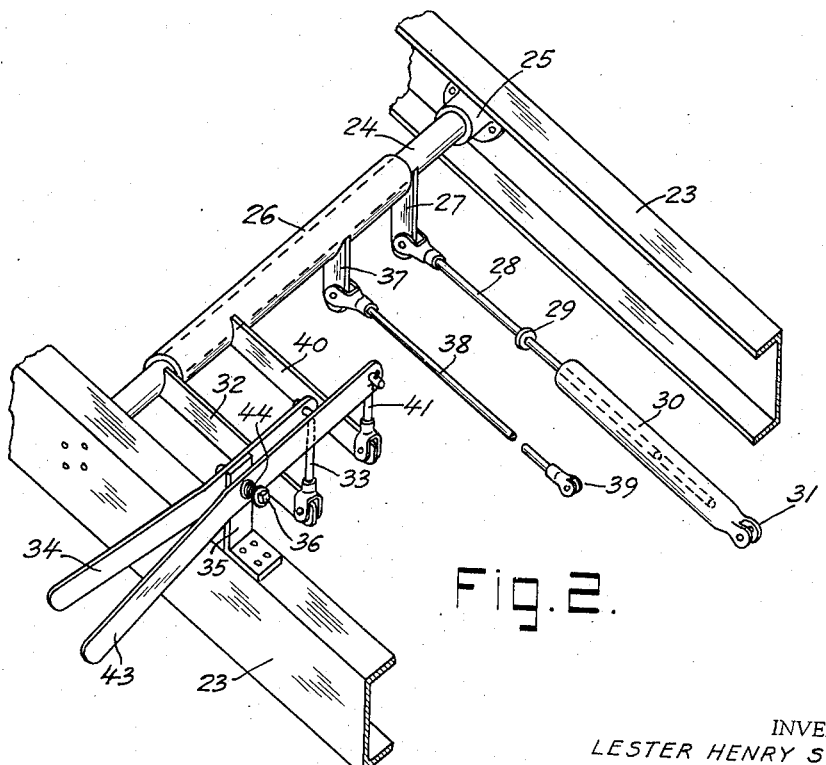

In the accompanying drawing a preferred embodiment of the invention is shown in which:

Figure 1 is a view showing a portion of a truck with my invention applied thereto, and Figure 2 is a detail view of the auxiliary operating means.

In Figure 1 a conventional type of automotive truck is shown at 3 having the cab 4 over the engine 5 with the fly wheel and clutch 6, the latter being operated in the usual way by means of the foot clutch pedal 7 and connecting rods 9 and 10, the latter being pivoted at 11 in the usual manner. The transmission is shown at 12 and the drive shaft at 13 for transmitting power to the rear wheels. In Figure 1 a cab over engine type of truck is shown, but the invention is equally applicable to other types of trucks in which the cab is in back of the engine.

Located inside the cab is the lever 14 which controls the power take off means, this lever 14 being pivoted at 15 on the vehicle frame and connected by rod 16 and lever 17, the latter pivoted at 18, to the rod 19 which moves a gear (not shown) into engagement with a drive gear within the transmission box 12. Upon engagement the shaft 20, having the universal joint 21, drives the oil pump 22 which discharges oil in the usual manner.

The mechanism just described is well known and I have provided the auxiliary controls therefor which will now be described. At a suitable place on the truck chassis 23, 23, preferably just back of the cab, I provide the rod 24 transversely of the chassis and journaled in bearings 25, one in each half of the chassis. A hollow tubular shaft 26 is fitted over the rod 24 before the latter is secured in place. A depending lever 27 secured to the rod 24, preferably by welding, is pivoted by means of clevis and pin to the rod 28 which has the stop washer 29 secured thereto at a suitable point, the forward end of the rod 28 extending in sliding relation inside the hollow tube 30, the latter having the clevis 31 by means of which and by means of suitable pin the tube 30 is pivoted to the upper end of the clutch control lever 10 previously described. Also secured to the rod 24 is the horizontally extending lever 32 the front end of which is pivoted to one end of the rod 33 by means of a suitable clevis and pin arrangement, the other end of the rod 33 being pivoted to one end of the lever 34, the other end of which is adapted to be moved by hand. The lever 34 is pivoted on the upright 35, secured to the chassis, by means of the bolt 36 which passes through the lever 43, to be described, and lever 34 and the upright 35. A spring 44 surrounds the bolt 36 and by tightening a suitable nut on the bolt 36, tension is placed on the levers 34 and 43. By depressing lever 34 the rod 28 is caused to move forward and stop 29 engages the tube 30 causing the same to move forward and to move lever 10 thus disengaging the automotive clutch. The sliding connection between rod 28 and tube 30 is provided so that foot operation of the clutch pedal 7 will not operate the chain of levers ending in hand lever 34.

A depending lever 37 secured to the shaft 26 is pivoted by means of clevis and pin to the rod 38 which in turn is pivoted to the upper end of lever 17, previously described, by means of clevis 39 and a suitable pin. Also secured to the shaft 26 is the horizontally extending lever 40 the front end of which is pivoted to one end of rod 41 by means of a suitable clevis and pin arrangement, the other end of rod 41 being pivoted to one end of lever 43, the other end of which is adapted to be moved by hand. By depressing lever 43 the rod 38 is caused to move forward to move lever 17 to cause the power take off gear to engage with the power transmitting gear in the transmission.

The operation of the mechanism will now be described. The driver of the truck after properly positioning the same in relation to the oil receiving point, permits the engine to continue running with the automotive gears in neutral position, and descends from the truck. After making the necessary hose connections between the oil tank and the oil receiving point, the driver depresses lever 34 which by the means described causes the automotive clutch to be disengaged and then he depresses the lever 43 which by the means described causes the power take off gear to become engaged. Then the lever 34 is permitted to rise thus allowing the clutch to become engaged and causing the drive shaft 20 to operate pump 22 to discharge the oil. Lever 43 remains depressed and is held in such position by the friction of the engaged gears and of the spring 44 and by the friction of the engaged power take off gear. When it is desired to cease the pumping, lever 34 is depressed to disengage the automotive clutch, lever 43 is raised to disengage the power take off gear and lever 34 is then permitted to rise under the influence of the usual spring (not shown) which normally operates on the clutch pedal 7 to keep the same in raised position.

The invention has been shown in connection with an oil pump mechanism for discharging oil but it is obvious that the auxiliary controls may be used on other arrangements where power take off means is used in connection with the load carried by the truck, as for instance with power take off means intended to raise a dump body of a dump truck.

The invention has been described in connection with a motor vehicle having a cab for the driver but it is obvious that the same may be used with other types of vehicles which are not necessarily equipped with cabs but in which the driver is still seated at a position similar to that occupied in the cab type vehicle shown. The essential point is that in any vehicle in which the normal control means for the power take off is adjacent to the driver as he is seated for normally driving the vehicle and operating the clutch, an auxiliary means is provided for manually operating the power take off and the clutch from outside the vehicle while the driver is standing on the ground.

I claim:

1. In a load carrying motor vehicle of the cab type having a power plant, means for discharging said load, a power plant take off means for operating said discharge means and normal control means for positive operation of said power take off means inside said cab, an attachment secured to the chassis comprising manually operable auxiliary control means for positively operating said power take off means from outside said cab.

2. In a load carrying motor vehicle of the cab type having a power plant, a clutch for said power plant operable from within said cab, means for discharging said load, a power plant take off means for operating said discharge means and normal control means for said power take off means inside said cab, an attachment secured to the chassis comprising auxiliary means for operating and controlling said clutch and said power take off means from outside said cab.

3. In a load carrying motor vehicle of the cab type having a power plant, a power transmission, a clutch between said power plant and said transmission operable from within said cab, means for discharging said load, a power plant take off means engageable with said power transmission for operating said discharge means and normal control means for said power take off means inside said cab, an attachment secured to the chassis comprising means for independently operating said clutch and said power take off means from outside said cab.

4. In a load carrying motor vehicle of the cab type having a power plant, a power transmission, a foot operated clutch between said power plant and said transmission operable from within said cab, means for discharging said load, a power plant take off means engageable with said power transmission for operating said discharge means, normal control means for said power take off means inside said cab, means for independently operating said clutch and said power take off means from outside said cab.

5. In a load carrying motor vehicle of the cab type having a power plant, a power transmission, a clutch between said power plant and said transmission, a foot operated clutch pedal operable from within said cab, means for discharging said load, a power plant take off means engageable with said power transmission for operating said discharge means, normal control means for said power take off means inside said cab, manual means for independently operating said clutch without moving said clutch pedal and for operating said power take off means from outside said cab.

6. In a load carrying motor vehicle of the cab type having a power plant, a power transmission, a clutch between said power plant and said transmission, a foot operated clutch pedal operable from within said cab, means for discharging said load, a power plant take off means engageable with said power transmission for operating said discharge means, normal control means for said power take off means inside said cab, an attachment secured to the chassis in the rear of said cab comprising a turnable rod transverse to and having bearings in said chassis, a hollow turnable shaft on said rod, a pair of projecting levers secured to and projecting at right angles from said rod and said shaft, one of each pair of levers being operatively connected to one of a pair of manually operable levers pivotally mounted on said chassis, the other of one pair of said levers being operatively connected to said normal control means, the other of the other pair of said levers having a rod connected thereto which fits into a shaft operatively connected to said foot pedal clutch operating means, a stop on said last named rod limiting the movement of said rod into said last named shaft and friction means on said pair of manually operable levers.

LESTER HENRY SOHL.